United States Patent Office 3,533,866
Patented Oct. 13, 1970

3,533,866
THERMAL LAMINATION OF NON-WOVEN POLY-OLEFIN FIBER BATTS TO POLYURETHANE FOAM
Sidney D. Blue, New York, N.Y., assignor to Reeves Brothers, Inc., New York, N.Y., a corporation of New York
No Drawing. Filed Mar. 7, 1967, Ser. No. 621,129
Int. Cl. B32b 5/18, 5/24, 31/12
U.S. Cl. 156—82                                  4 Claims

ABSTRACT OF THE DISCLOSURE

Composite, multi-layer, non-woven polyolefin fiber/polyurethane foam structures, suitable for use as carpet underlay or as garment interlinings, may be produced by heating the surface of a batt or unoriented polyolefin fiber to its softening point, at which temperature the surface is tacky. While still in a tacky state, this surface is laminated to polyurethane foam which has not been heated, thereby forming a dimensionally stable laminate. An example is given showing the thermal lamination of an unoriented polypropylene fiber batt to a flexible polyether-derived polyurethane foam.

---

This invention relates to the thermal lamination of polyolefin fiber to polyurethane foam and provides an improved method for thermally laminating a non-woven polyolefin fiber batt to layer of polyurethane foam to produce a composite, multi-layer structure which is useful as a carpet underlay or in fabricating apparel. The invention is based on the discovery that it is possible to flame the surface of a batt of unoriented polyolefin fiber until the surface becomes tacky, and then to pressure laminate this tacky surface to a layer of flexible polyurethane foam (which has not and need not be heated), thereby forming a dimensionally stable fiber/foam laminate in which the batt does not undergo shrinkage upon cooling. The invention is particularly useful in producing fiber/foam laminates from unoriented polypropylene fiber batts and flexible polyether-derived polyurethane foams.

Flame lamination of polyurethane foam to fabrics has become one of the most successful and commercially important techniques in the textile industry. Developed by John W. Dickey and described more fully in U.S. Letters Pats. Nos. 2,957,793 and 3,057,766, the flame lamination of polyurethane foam to fabric (or any other substrate) is based on flaming the surface of a polyurethane foam at a temperature of about 550° C., for about 0.2 second, at which temperature the surface of foam undergoes pyrolytic decomposition to form a transiently adhesive surface which has recently been demonstrated to contain free isocyanate. Pressure lamination of this transiently adhesive surface to a fabric produces the foam/fabric laminate which has found so many applications in the textile industry. As a practical matter, however, it is frequently difficult if not impossible to flame laminate polyether-derived (as opposed to polyester-derived) polyurethane foam by this process, and hence the textile industry has utilized flame lamination almost exclusively with polyester-derived polyurethane foams.

Because of recent developments in polyolefin fiber technology, which have been evidenced by the increasing use of non-woven polyolefin fiber batts for inexpensive yet attractive carpeting, it has now become somewhat important to be able to produce composite laminates of polyolefin fiber and flexible polyether-derived polyurethane foams, which are generally softer and more resilient than the flexible polyester-derived polyurethane foams. These composite laminates should be particularly suitable for use in carpet underlay and in fabricating certain types of apparel. Since the polyether-derived polyurethane foams, as a practical matter, are difficult if not impossible to flame laminate to a fiber batt, logic dictates that it might be possible to flame the surface of the polyolefin fiber batt to its softening point and then pressure laminate the two layers together.

Investigation has revealed that all of the commercially available polyolefin fibers are oriented or drawn immediately after extrusion of the molten polymer through a spinnerette, since drawing causes the polymer molecules in the fiber to undergo axial orientation which, in turn, increases the strength of the fiber. Flaming the surface of a batt of oriented (or "drawn," the two terms being interchangeably used herein) polyolefin fiber to a temperature at or above the softening point of the polymer results in a characteristic "beading" or "balling" of the free fiber ends. Consequently, when the surface of a batt of oriented polyolefin fiber is flamed and then immediately pressure laminated to a layer flexible polyether-derived polyurethane foam, bonding occurs only at the points of contact between the molten "beaded" fiber ends and the foam surface. Moreover, when a batt of oriented polyolefin fiber is heated sufficiently to soften the entire surface, severe warping and dimensional shrinkage take place, which, in turn, results in a warping of the foam/fiber laminate. Warped foam/fiber laminates are useless for carpet underlay or for fabricating any apparel.

By using a batting composed of unoriented (or undrawn) polyolefin fiber, I have found that it is possible to flame the surface of the unoriented polyolefin fiber batt until the entire surface becomes tacky and then, while this surface is still in a tacky state, to pressure laminate the batt to a layer of polyurethane foam to form a strongly bonded, composite, multi-layer foam/fiber structure in which the unoriented polyolefin fiber batt is dimensionally stable with respect to the polyurethane foam layer and does not undergo shrinkage upon cooling.

Based upon these discoveries, the invention provides an improved method of thermally laminating a non-woven polyolefin fiber batt to polyurethane foam to produce a composite, multi-layer structure, which method comprises (a) flaming one surface of a batt of unoriented polyolefin fiber until the flamed surface becomes tacky; and (b) while the flamed surface is still in a tacky state, pressure laminating the tacky surface of the unoriented polyolefin batt to a layer of flexible polyurethane foam to bond the unoriented polyolefin batt to the polyurethane foam layer, thereby forming a composite, multi-layer, non-woven, polyolefin fiber/polyurethane foam structure in which the unoriented polyolefin fiber batt is dimensionally stable with respect to the polyurethane foam layer and does not undergo shrinkage upon cooling. The invention also contemplates the composite, multi-layer foam/fiber structures produced by this method, which structures have been found particularly suitable for use as carpet underlay and in fabricating certain types of apparel underlining.

To produce these composite, multi-layer, non-woven polyolefin fiber/polyurethane foam structures in accordance with the method of the invention, the batt must be composed of unoriented (or "undrawn," the two terms being used interchangeably) polyolefin fiber, which fiber is obtained by extruding the molten polyolefin through spinnerettes from which it is taken off immediately without drawing the fiber to its oriented high strength state. Among those unoriented polyolefin fibers which have been found to be particularly suitable for use in the batt are polyethylene, polypropylene, and various interpolymers and block copolymers of ethylene and propylene. For best results, however, the batt should be composed of unoriented polypropylene fiber, which need not be of first quality if the composite structure is to be used as carpet underlay which generally is not exposed to sunlight.

In accordance with the method of the invention, the unoriented polyolefin fiber batt is flamed on a flame laminator so that the flame is directed to one side of the batt, the rate at which the unoriented polyolefin fiber batt is passed through the flame laminator being such that the flamed surface is exposed to the flame for a period of time which is just sufficient to cause the surface to become tacky, which occurs at or above the softening temperature of the undrawn fiber. Immediately after one surface of the batt has been flamed and while this surface is still in the tacky state, the batt is laminated to a layer of flexible polyurethane foam, which may be either polyether- or polyester-derived. Upon cooling, the unoriented polyolefin fiber batt shows no tendency to undergo shrinkage or to warp the laminate.

As described below, the method of the invention has been adapted for the production of a composite, multi-layer foam/fiber structure which is suitable for use as carpet underlay:

Unoriented polypropylene fiber, which had actually been collected from the spinnerette waste discarded in the regular commercial production of polypropylene fiber, was chopped into random lengths varying from 1 to 4 inches, garnetted, and formed into a batting having a thickness of about ⅛-inch, which was then placed in rolls. The rolled unoriented polypropylene batt was mounted on a flame laminator so that the batt would pass over the flame roll with the flame directed at one surface. A roll of flexible polyester-derived polyurethane foam (¼-inch thickness) was also mounted on the flame laminator.

After mounting the two separately rolled elements, the laminator was run at about 30 yards per minute (normal squeeze) with the flame directed at the inner surface of the batt, under which conditions the flamed surface of the batt becomes soft and tacky. This procedure results in the surface of the fiber layer of the batt being bonded to the face of the polyether-derived polyurethane foam. Upon cooling, the resultant laminate was dimensionally stable and the batt did not undergo any shrinkage.

Although the foregoing example illustrates the production of composite, multi-layer foam/fiber structures by the thermal lamination of an unoriented polypropylene fiber batt and a layer of flexible polyether-derived polyurethane foam, the method of the invention is equally applicable to the thermal lamination of any unoriented polyolefin fiber batt to a layer of any flexible polyether- or polyester-derived polyurethane foam.

I claim:
1. The method of thermally laminating a non-woven polyolefin fiber batt to polyurethane foam to produce a composite, multi-layer structure, which comprises:
   (a) flaming one surface of a batt of unoriented polyolefin fiber until the flamed surface becomes tacky; and
   (b) while the flamed surface is still in a tacky state, pressure laminating the tacky surface of the unoriented polyolefin batt to a layer of flexible polyurethane foam to bond the unoriented polyolefin batt to the polyurethane foam layer, thereby forming a composite, multi-layer, non-woven, polyolefin fiber/polyurethane foam structure in which the unoriented polyolefin fiber batt is dimensionally stable with respect to the polyurethane foam layer and does not undergo shrinkage upon cooling.

2. The method of producing a composite, multi-layer, non-woven polyolefin fiber/polyurethane foam structure according to claim 1, in which the batt is composed of unoriented polypropylene fiber.

3. The method of producing a composite, multi-layer, non-woven polyolefin fiber/polyurethane foam structure according to claim 1, in which the flexible polyurethane foam layer is composed of a polyether-derived polyurethane foam.

4. The method of producing a composite, multi-layer, non-woven polyolefin fiber/polyurethane foam structure according to claim 1, in which the batt is composed of unoriented polypropylene fiber and the flexible polyurethane foam layer is composed of a polyether-derived polyurethane foam.

References Cited

UNITED STATES PATENTS

| | | |
|---|---|---|
| 3,142,331 | 7/1964 | Dierks. |
| 3,223,568 | 12/1965 | Alderfer _____ 156—255 |
| 3,325,332 | 6/1967 | Cleereman _____ 156—82 XR |

ROBERT F. BURNETT, Primary Examiner

W. A. POWELL, Assistant Examiner

U.S. Cl. X.R.

156—306; 161—150, 159